US008192195B2

(12) United States Patent
Borders et al.

(10) Patent No.: US 8,192,195 B2
(45) Date of Patent: Jun. 5, 2012

(54) BURNER APPARATUS AND METHODS FOR MAKING INORGANIC FIBERS

(75) Inventors: Harley Allen Borders, Highlands Ranch, CO (US); Michael R. Nijakowski, Whitehouse, OH (US); William J. Thome, Maumee, OH (US); Raymond L. McKenzie, Swanton, OH (US)

(73) Assignee: Johns Manville, Denver, CO (US)

( * ) Notice: Subject to any disclaimer, the term of this patent is extended or adjusted under 35 U.S.C. 154(b) by 545 days.

(21) Appl. No.: 12/460,530

(22) Filed: Jul. 21, 2009

(65) Prior Publication Data
US 2009/0297994 A1 Dec. 3, 2009

Related U.S. Application Data

(62) Division of application No. 11/314,436, filed on Dec. 21, 2005, now Pat. No. 7,581,948.

(51) Int. Cl.
*F27B 21/06* (2006.01)
*F23D 14/38* (2006.01)
*F23D 14/22* (2006.01)
*F23D 14/32* (2006.01)

(52) U.S. Cl. .......... 431/354; 431/8; 431/10; 431/181; 431/190; 431/350; 65/468; 65/528

(58) Field of Classification Search .............. 431/354, 431/8, 10, 157, 158, 162, 164, 181, 190, 431/350, 351, 352, 353; 65/468, 528; *F27B 21/06; F23D 14/38, 14/22, 14/32*
See application file for complete search history.

(56) References Cited

U.S. PATENT DOCUMENTS

| 10,529 | A | * | 2/1854 | Webster et al. ............... 60/522 |
| 1,904,469 | A | * | 4/1933 | Keller ......................... 423/458 |
| 1,923,942 | A | | 8/1933 | Lufkin |
| 1,991,331 | A | | 2/1935 | Morton |
| 1,999,762 | A | | 4/1935 | Howard |

(Continued)

FOREIGN PATENT DOCUMENTS
EP 895030 A1 * 2/1999
(Continued)

OTHER PUBLICATIONS

PLUS Search Results for U.S. Appl. No. 11/314,436 Searched May 22, 2007.

(Continued)

*Primary Examiner* — Steven B McAllister
*Assistant Examiner* — Daniel E Namay
(74) *Attorney, Agent, or Firm* — Robert D. Touslee

(57) ABSTRACT

Inorganic fiber production burner apparatus and methods of use are disclosed. One burner includes a refractory block adapted to be in fluid connection with sources of primary oxidant and fuel, the refractory block having a fuel and primary oxidant entrance end and a flame exit end, the flame exit end having a substantially rectangular flame exit having a width greater than its height, the refractory block defining a combustion chamber and a second chamber fluidly connecting the combustion chamber and the flame exit end; and an oxygen manifold fluidly connected to the combustion chamber and adapted to route oxygen to the combustion chamber through a plurality of passages through the refractory block. This abstract allows a searcher or other reader to quickly ascertain the subject matter of the disclosure. It will not be used to interpret or limit the scope or meaning of the claims. 37 CFR 1.72(b).

10 Claims, 6 Drawing Sheets

U.S. PATENT DOCUMENTS

| | | | |
|---|---|---|---|
| 2,113,236 A | 10/1938 | Slayter et al. | |
| 2,234,986 A | 3/1941 | Slayter et al. | |
| 2,300,011 A * | 10/1942 | Rose | 237/8 A |
| 2,334,961 A | 11/1943 | Schoenlaub | |
| 2,427,545 A * | 9/1947 | Berger, Jr. | 239/597 |
| 2,450,363 A * | 9/1948 | Fletcher et al. | 65/462 |
| 2,460,085 A * | 1/1949 | Hess | 432/10 |
| 2,489,243 A * | 11/1949 | Stalego | 65/462 |
| 2,489,244 A * | 11/1949 | Stalego | 65/462 |
| 2,559,504 A * | 7/1951 | Henwood | 431/158 |
| 2,559,572 A * | 7/1951 | Stalego | 65/462 |
| 2,681,863 A | 6/1954 | Croce et al. | |
| 2,687,551 A * | 8/1954 | Stalego | 65/462 |
| 2,744,022 A | 5/1956 | Croce et al. | |
| 2,925,620 A | 2/1960 | Karlovitz | |
| 2,996,102 A | 8/1961 | Schuller | |
| 3,076,236 A | 2/1963 | Labino | |
| 3,084,392 A * | 4/1963 | Labino | 65/468 |
| 3,174,527 A | 3/1965 | Reed et al. | |
| 3,363,663 A * | 1/1968 | Porter | 431/6 |
| 3,390,944 A * | 7/1968 | Flynn | 431/158 |
| 3,409,229 A * | 11/1968 | Stalego | 239/132.3 |
| 3,736,094 A | 5/1973 | Shisler | |
| 3,837,832 A | 9/1974 | Decoraro et al. | |
| 3,954,382 A | 5/1976 | Hirose | |
| 4,167,404 A | 9/1979 | Loeffler et al. | |
| 4,168,959 A | 9/1979 | Loeffler | |
| 4,343,605 A * | 8/1982 | Browning | 431/8 |
| 4,414,010 A | 11/1983 | Chin et al. | |
| 4,481,024 A | 11/1984 | Bly | |
| 4,534,779 A | 8/1985 | Herschler | |
| 4,631,023 A * | 12/1986 | Courrege | 431/329 |
| 4,824,456 A * | 4/1989 | Schlachter | 65/479 |
| RE33,136 E * | 12/1989 | Courrege | 431/329 |
| 5,006,141 A | 4/1991 | Chen et al. | |
| 5,154,746 A | 10/1992 | Okuma et al. | |
| 5,299,929 A | 4/1994 | Yap | |
| 5,360,171 A | 11/1994 | Yap | |
| 5,401,588 A | 3/1995 | Garvey et al. | |
| 5,452,496 A | 9/1995 | Long et al. | |
| 5,455,991 A | 10/1995 | Long et al. | |
| 5,545,031 A | 8/1996 | Joshi et al. | |
| 5,554,324 A | 9/1996 | Bernard et al. | |
| 5,575,637 A | 11/1996 | Slavejkov | |
| 5,585,180 A | 12/1996 | Fadell | |
| 5,588,976 A | 12/1996 | Miller | |
| 5,601,228 A | 2/1997 | Fukunaga et al. | |
| 5,724,901 A | 3/1998 | Guy et al. | |
| 5,743,723 A | 4/1998 | Iatrides et al. | |
| 5,829,962 A | 11/1998 | von Drasek et al. | |
| 5,833,447 A | 11/1998 | Bodelin et al. | |
| 5,882,184 A | 3/1999 | Feldermann | |
| 5,900,037 A | 5/1999 | Yang et al. | |
| 5,954,498 A | 9/1999 | Joshi et al. | |
| 5,970,752 A * | 10/1999 | Cusick et al. | 65/500 |
| 5,975,886 A * | 11/1999 | Philippe | 431/165 |
| 5,984,667 A | 11/1999 | Philippe et al. | |
| 6,068,468 A * | 5/2000 | Philippe et al. | 431/175 |
| 6,071,116 A | 6/2000 | Philippe et al. | |
| 6,074,197 A | 6/2000 | Philippe | |
| 6,113,389 A | 9/2000 | Joshi et al. | |
| 6,123,542 A | 9/2000 | Joshi et al. | |
| 6,126,438 A | 10/2000 | Joshi et al. | |
| 6,141,992 A | 11/2000 | Gross et al. | |
| 6,155,818 A | 12/2000 | Joshi et al. | |
| 6,171,100 B1 | 1/2001 | Joshi et al. | |
| 6,210,151 B1 | 4/2001 | Joshi et al. | |
| 6,247,315 B1 | 6/2001 | Marin et al. | |
| 6,250,916 B1 | 6/2001 | Philippe et al. | |
| 6,264,466 B1 | 7/2001 | Joshi et al. | |
| 6,273,180 B1 | 8/2001 | Joshi et al. | |
| 6,276,924 B1 | 8/2001 | Joshi et al. | |
| 6,276,928 B1 | 8/2001 | Joshi et al. | |
| 6,398,547 B1 | 6/2002 | Joshi et al. | |
| 6,524,097 B2 * | 2/2003 | Hoke et al. | 431/8 |
| 6,584,809 B1 | 7/2003 | Gross et al. | |
| 6,652,265 B2 | 11/2003 | Cain | |
| 6,659,762 B2 | 12/2003 | Borders et al. | |
| 6,783,357 B2 | 8/2004 | Joshi et al. | |
| 6,883,721 B2 | 4/2005 | Marin et al. | |
| 7,500,849 B2 * | 3/2009 | Dudill et al. | 431/8 |
| 7,581,948 B2 | 9/2009 | Borders et al. | |
| 2003/0091948 A1 * | 5/2003 | Bool et al. | 431/10 |
| 2005/0123874 A1 * | 6/2005 | Abbasi et al. | 431/351 |

FOREIGN PATENT DOCUMENTS

| | | | |
|---|---|---|---|
| GB | 2051774 A * | 1/1981 | |
| GB | 2053889 A * | 2/1981 | |
| JP | 53143737 A * | 12/1978 | |
| JP | 01054106 A * | 3/1989 | |
| JP | 01121611 A * | 5/1989 | |

OTHER PUBLICATIONS

EAST Search History for U.S. Appl. No. 11/314,436, May 23, 2007.

* cited by examiner

BURNER APPARATUS AND METHODS FOR MAKING INORGANIC FIBERS

This application is a division of application Ser. No. 11/314,436, filed Dec. 21, 2005 now U.S. Pat. No. 7,581,948. The present invention relates generally to the field of combustion burners and methods of use, and more specifically to burners and methods of use in flame attenuation fiberization processes producing inorganic microfibers and other fibers.

BACKGROUND OF THE INVENTION

1. Field of Invention

The present invention relates generally to the field of combustion burners and methods of use, and more specifically to burners and methods of use in flame attenuation fiberization processes producing inorganic microfibers and other fibers.

2. Related Art

One process for manufacturing fine diameter mineral fibers, e.g. discrete length, glass fibers typically ranging from about 0.2 microns to about 7.0 microns in diameter, is the flame attenuation process. In this process, an electrically or gas flame heated pot or melter containing a molten fiberizable material such as glass batch materials or preformed marbles are melted and drawn from a plurality of outlet orifices of a bushing to form continuous primary filaments. The primary continuous filaments are drawn from the heated pot or melter by pull rolls which also function to feed the continuous primary filaments into a high temperature, high energy, gas flame that further attenuates the continuous primary filaments and forms short length, fine diameter fibers from the continuous primary filaments. These attenuating burners have extremely high gas flow rates in order to stretch the filaments while they are heated so as to reduce their diameter.

Energy costs continue to increase, spurring efforts to find ways to reduce the amount of fuel in mineral fiber manufacturing. The high velocity attenuation blast entrains cooler air from its surroundings. This low energy, low velocity air is mixed with the attenuation stream thereby diluting it and reducing both its temperature and velocity. The capability of the attenuating apparatus to reduce fiber diameter (i.e., to improve the filtration properties or insulating capabilities of the material) is hampered by this unrestricted stream dilution. To offset the disadvantages of dilution, more gas must be burned to produce higher temperatures.

Oxy-fuel burners have been used for many years in the glass industry in general especially in the fiberglass, TV glass, and container glass industry segments. There are few complete oxy-fuel fired float furnaces in the operation today and they have been using retrofit oxy-fuel burners designed specifically for smaller container or fiberglass furnaces. These conversions were most likely made to meet emissions standards. Known oxy-fuel burners are predominately nozzle mix designs and avoid premixing for safety reasons due to the increased reactivity of using oxygen as the oxidant versus air. Some common designs of nozzle mix oxy-fuel burners are described in U.S. Pat. Nos. 5,199,866; 5,490,775; and 5,449,286. The concept of nozzle mix oxy-fuel burners is to mix fuel and oxygen at the burner nozzle. These burners can include single or multiple nozzles for fuel and/or oxygen. The flame produced is a diffusion flame with the flame characteristics determined by mixing rates. Short intense flames are most common with these burners, however some delayed mixing geometries are considered to generate longer luminous flames. Another more recent burner type used in the glass industry for melting applications is the "flat flame" burner. These are multi-orifice burners with various geometries that can produce a flame that is 2 to 3 times wider than a traditional (cylindrical) oxy-fuel flame. U.S. Pat. Nos. 5,545,031; 5,360,171; 5,299,929; and 5,575,637 show examples of flat flame burners.

Oxy-fuel burners have not been proposed for use in glass re-melt fiberization applications. This may be due to any of a variety of factors. Not only are the fields of use quite different, but the nature of the molten material and fibers to be produced, and equipment being different (fibers vs. large pools of molten material, usage of burners to attenuate fibers vs. usage of burners for melting) leads to very different problems to be solved, despite the fact that decreased energy usage is a common goal of many industries, including both the float glass and mineral fiber industries. As the end use of mineral fibers depends on the physical properties of the fibers, such as their ability to be dispersed in liquids and slurries, or their ability to function as filter media or insulation, producers are careful not to change a process that produces acceptable fibers for a small decrease in energy consumption.

Because of this it would be an advance in the mineral fiberization art to develop re-melt fiberization burners to attenuate mineral fibers, reduce energy requirements a significant amount in mineral fiberization processes to make their implementation attractive, particularly in situations where the fiber physical properties are acceptable, or even better than acceptable, in terms of higher quality fibers and products employing the fibers, such as filtration and insulation products, and paper products.

SUMMARY OF THE INVENTION

In accordance with the present invention, apparatus and processes of use are described that reduce energy usage, as well as unexpectedly produce better quality fibers than previously known fiberization apparatus and methods. By controlling one or more operating parameters of a fiberization burner, either through heat recovery, use of oxygen-enriched oxidants, or both, apparatus and processes of the invention allow production of inorganic fibers having greater average strength and length while reducing or eliminating shot compared to conventional burners that do not use heat recovery or oxygen-enriched oxidants. In certain embodiments, for example when oxygen is not available, or available but too expensive, processes and systems are described employing preheating air and/or fuel with auxiliary heat sources such as electrical resistance elements, coal-fired high pressure steam, and the like. One goal of processes and systems of the invention is to elevate the combustion gas temperature, or flame temperature, leaving the burner. Energy economics may dictate using these alternatives in lieu of oxygen. When an oxygen-enriched oxidant is employed, heat recovery techniques may also be used as the oxy-fuel flame temperatures are higher than air-fuel flame temperatures.

A first aspect of the invention is a burner apparatus, the apparatus comprising:

a refractory block adapted to be in fluid connection with sources of primary oxidant and fuel, the refractory block having a fuel and primary oxidant entrance end and a flame exit end, the flame exit end having a substantially rectangular flame exit having a width greater than its height, the refractory block defining a combustion chamber and a second chamber fluidly connecting the combustion chamber and the flame exit end; and an oxygen manifold fluidly connected to the combustion chamber and adapted to route oxygen to the combustion chamber through a plurality of passages through the refractory block.

As used herein the term "primary oxidant" means air, or compositions comprising the same molar concentration of oxygen as air, while the terms "oxygen" and "secondary oxidant" are used interchangeably, according to the present invention, and mean a gas with an oxygen molar concentration of at least 50%. Such oxidants include oxygen-enriched air containing at least 50% vol., oxygen such as "industrially" pure oxygen (99.5%) produced by a cryogenic air separation plant or non-pure oxygen produced by e.g. a vacuum swing adsorption process or membrane permeation (about 90% vol. $O_2$ or more). Apparatus embodiments within this aspect of the invention may include a plurality of tubes functioning to route the oxygen through the refractory block, the tubes fluidly connected to one or more oxygen supply manifolds. Both the tubes and the manifolds may be comprised of metal, ceramic, ceramic-lined metal, or combination thereof.

In all apparatus embodiments of the invention the sources of primary oxidant and fuel may be one or more conduits, pipelines, storage facility, cylinders, or, in the case of primary oxidant, ambient air. Secondary oxidant may be supplied from a pipeline, cylinder, storage facility, cryogenic air separation unit, membrane permeation separator, or adsorption unit such as a vacuum swing adsorption unit.

A second apparatus aspect of the invention comprises:

a refractory block as in the first aspect of the invention; and an oxygen injection manifold fluidly connecting the sources of primary oxidant and fuel and the refractory block, the oxygen injection manifold comprising one or more oxygen manifolds exposed to the combustion chamber and fluidly connecting a source of oxygen and the fuel and primary oxidant end of the refractory block, and further comprising means for supplying a coolant (gas, liquid, or combination thereof) to cool the oxygen manifolds during combustion and means for collecting a warmed coolant. The coolant may be any heat transfer fluid and may be any gaseous, liquid, or some combination of gaseous and liquid composition that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids which may be organic, inorganic, or some combination thereof, for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Apparatus embodiments in accordance with this aspect of the invention include those embodiments wherein the one or more oxygen manifolds comprises an upper oxygen manifold adapted to direct oxygen downward into the flow path of fuel and primary oxidant, and a lower oxygen manifold adapted to direct oxygen upward into the path. The oxygen manifolds may be metallic or ceramic tubes having a plurality of holes for directing oxygen into the flow path of fuel and primary oxidant. The means for supplying a coolant to cool the oxygen manifolds during combustion and the means for collecting a warmed coolant may be conduits, tubes, hoses or their equivalent, such as stainless steel or ceramic tubes or pipes, or rubber hoses.

A third aspect of the invention is a burner apparatus, comprising:

a plurality of oxygen conduits in a first horizontal plane having inlet ends and outlet ends, the inlet ends fluidly connected to a source of oxygen, and the outlet ends fluidly connected to an entrance to a refractory slot;

a plurality of fuel conduits in a second horizontal plane below the first plane and substantially parallel thereto, the plurality of fuel conduits having inlet ends and outlet ends, the inlet ends fluidly connected to a source of fuel, and the outlet ends fluidly connected to the entrance to the refractory slot;

wherein the refractory slot defines a recess wherein the ends of the oxygen conduits and the ends of the fuel conduits are recessed from an exit of the refractory slot, and the plurality of oxygen conduits and the plurality of fuel conduits are adapted to disperse the fuel and the oxygen uniformly and begin combusting the fuel in the refractory slot, the refractory slot is adapted to direct a flame toward primary fibers to be fiberized.

Apparatus within this aspect of the invention include those wherein the ratio of number of oxygen conduits to fuel conduits may range from about 1 to about 5, or from about 2 to about 4, and wherein the oxygen conduits may all be circular in cross-section and have the same diameter, and wherein the fuel conduits may all be circular and have the same diameter. Other apparatus within this embodiment include those wherein the oxygen conduits are all equal in length, and all fuel conduits are equal in length. Other apparatus within this embodiment include those wherein the recess defined by the refractory chute has a width W, a depth D, and a height H within the following ranges: W/H ranges from about 10 to about 100, or from about 15 to about 80, and W/D ranges from about 4 to about 12, or from about 6 to about 10. Other embodiments include those wherein the ratio of length of oxygen conduits and fuel conduits to depth of recess D ranges from about 5 to about 10.

A fourth aspect of the invention is method, comprising:

a) providing a supply of a primary oxidant fluid stream to a refractory burner block;

b) providing a supply of a fuel fluid stream to the burner block;

c) mixing the primary oxidant with the fuel to form an intermediate mixture, the intermediate mixture flowing into a combustion chamber defined by the burner block;

d) injecting an oxygen stream into the intermediate mixture to form a combustion mixture;

e) combusting the fuel fluid in the combustion chamber to form a flame;

f) forcing the flame through a slot exit from the refractory burner block to form a substantially flat flame;

g) directing the substantially flat flame to intersect a primary fiber; and h) attenuating and fiberizing the primary fiber to form a plurality of fibers.

Methods within this aspect include those embodiments wherein the primary oxidant is air, the fuel is a gaseous fuel, the gaseous fuel selected from methane, natural gas, liquefied natural gas, propane, carbon monoxide, hydrogen, steam-reformed natural gas, atomized oil or mixtures thereof, and the oxygen stream comprises at least 90 mole percent oxygen. In certain apparatus the oxygen may be injected into the intermediate mixture upstream of the combustion chamber, while in other embodiments the oxygen may be injected into the combustion chamber. The oxygen injection velocity may be 200 ft/sec or less at a flow rate ranging from 0 to about 400 scfh, and may be injected through a non-cooled manifold, a gas-cooled manifold, or a liquid-cooled manifold. The gas-cooled manifold may utilize air as a coolant gas, while the liquid-cooled manifold may use water as a coolant. Methods of the invention include those wherein the combustion chamber pressure does not exceed 10 psig.

Another aspect of the invention are methods comprising:

a) providing a supply of a primary oxidant fluid stream to a refractory burner block;

b) providing a supply of oxygen fluid stream to the burner block;

c) mixing the primary oxidant with the oxygen to form an intermediate mixture, the intermediate mixture flowing to a combustion chamber defined by the burner block;

d) injecting a fuel fluid stream into the intermediate mixture to form a combustion mixture;

e) combusting the fuel fluid in the combustion chamber to form a flame;

f) forcing the flame through a slot exit from the refractory burner block to form a substantially flat flame;

g) directing the substantially flat flame to intersect a primary fiber; and h) attenuating and fiberizing the primary fiber to form a plurality of fibers.

Methods within this aspect include those embodiments wherein the primary oxidant is air, the fuel is a gaseous fuel, the gaseous fuel selected from methane, natural gas, liquefied natural gas, propane, carbon monoxide, hydrogen, steam-reformed natural gas, atomized oil or mixtures thereof, and the oxygen stream comprises at least 90 mole percent oxygen. In certain apparatus the fuel may be injected into the intermediate mixture upstream of the combustion chamber, while in other embodiments the fuel may be injected into the combustion chamber. The fuel may be injected through a non-cooled manifold, a gas-cooled manifold, or a liquid-cooled manifold. The gas-cooled manifold may utilize air as a coolant gas, while the liquid-cooled manifold may use water as a coolant. Methods of the invention include those wherein the combustion chamber pressure does not exceed 10 psig.

Another method of the invention comprises:

a) flowing oxygen through a plurality of oxygen conduits in a first horizontal plane having inlet ends and outlet ends, the inlet ends fluidly connected to a source of oxygen, and the outlet ends fluidly connected to an entrance to a refractory slot;

b) flowing a fuel fluid through a plurality of fuel conduits in a second horizontal plane below the first plane and substantially parallel thereto, the plurality of fuel conduits having inlet ends and outlet ends, the inlet ends fluidly connected to a source of fuel, and the outlet ends fluidly connected to the entrance to the refractory slot;

c) combusting the fuel in the refractory slot to form a substantially flat flame, the refractory slot defining a recess wherein the ends of the oxygen conduits and the ends of the fuel conduits are recessed from an exit of the refractory slot, the plurality of oxygen conduits and the plurality of fuel conduits dispersing the fuel and the oxygen uniformly in the recess; and d) directing the substantially flat flame to intersect a primary fiber; and e) attenuating and fiberizing the primary fiber to form a plurality of fibers.

All apparatus and method embodiments of the invention may be controlled by one or more controllers. For example, fiberization burner flame temperature may be controlled by monitoring one or more parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Exemplary apparatus and methods of the invention comprise a combustion controller which receives one or more input parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, pressure of the oxidant entering the burner, humidity of the oxidant, burner geometry, oxidation ratio, temperature of the effluent and combinations thereof, and employs a control algorithm to control combustion temperature based on one or more of these input parameters.

Apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

The invention describes inorganic material fiberization burner apparatus and methods of using same. Although the invention is not limited to so-called "microfiber" production processes and systems, it is helpful to define the term as a starting point. As used herein, "microfibers" are defined as fibers having a mean diameter ranging from about 0.05 to about 3.5 micrometers, more typically from about 0.1 to about 1.0 micrometers. Microfibers produced by processes and systems of the invention may have a length to diameter ratio of at least about 5:1 and more usually from about 3000:1 to about 10:1. The length to diameter ratio of the microfibers most often averages from about 10:1 to about 2000:1. The average length and diameter of the microfibers can be controlled by controlling the combustion process, and secondarily by the composition and flow rate of the molten inorganic material being fiberized. Generally, microfibers produced using processes and systems of the invention have an average length of less than about 0.05 inches. Normally, the microfibers have an average length ranging from about 1 to about 500 micrometers, more usually ranging from about 10 to about 300 micrometers, and most often the fiber length averages from about 25 to about 50 micrometers. Procedures for determining the average diameters and lengths of particular batches of microfibers are well known to those skilled in the art and need not be repeated.

"Fiberization" is used as a verb unless otherwise noted, and means forming short fibers, which may or may not be microfibers, from a primary, relatively continuous fiber using a hot blast process modified in accordance with the invention, where hot combustion gases attenuate the primary fiber, and aspirated air is used to cool the attenuated fibers and cause the attenuated primary fibers to break into short, staple fibers.

Given that safety, decreased energy consumption, production capacity, and fiber physical properties are primary concerns, and that there is considerable investment in existing equipment, it would be an advance in the art if existing fiberization burners and methods could be modified to increase safety, energy efficiency, productivity, and product quality, or new burners designed for these purposes whose capital outlay would be returned quickly through energy efficiency and increased sales of product. This invention offers burner apparatus and methods for these purposes.

Figure 1:
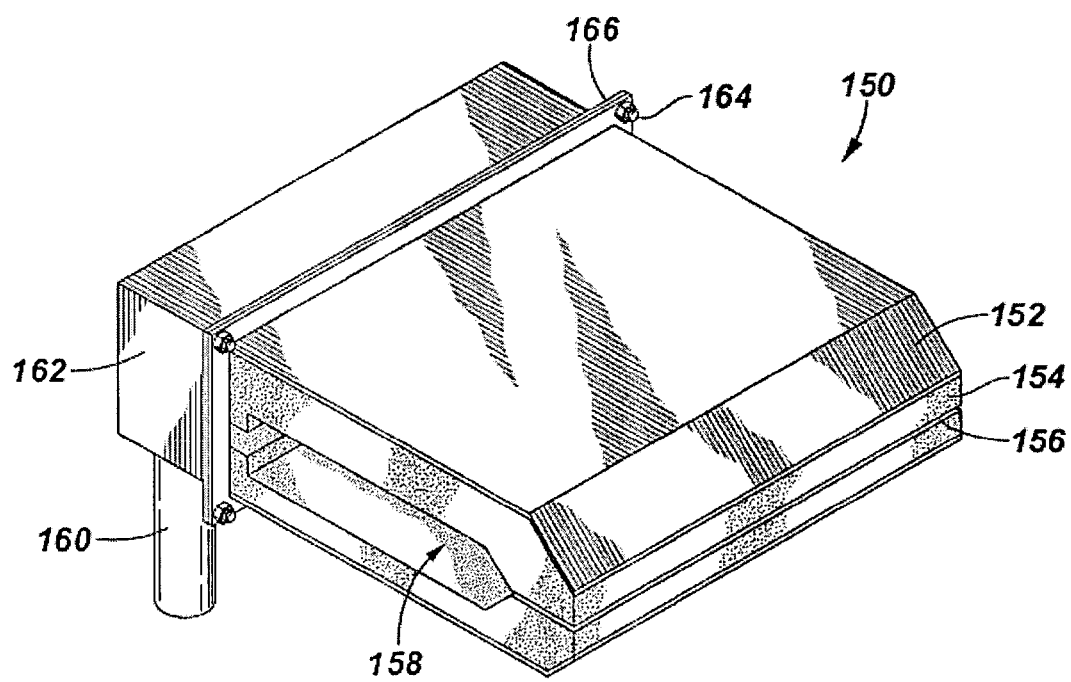
FIG. 1 a perspective view of a prior art fiberization burner.

Referring now to the figures, FIG. 1 is a perspective view, with parts broken away to show the interior, of a prior art fiberization burner 150, having a stainless steel or other metallic shell 152, a refractory burner block 154 defining a burner slot 156 and a combustion chamber 158. An air-fuel mix manifold, 160 and 162 routes air and fuel, typically natural gas, to the combustion chamber 158. Manifold 160 and 162 is mounted to burner block 154 through mounting holes 164 (four typically) through flange 166.

Figure 2:
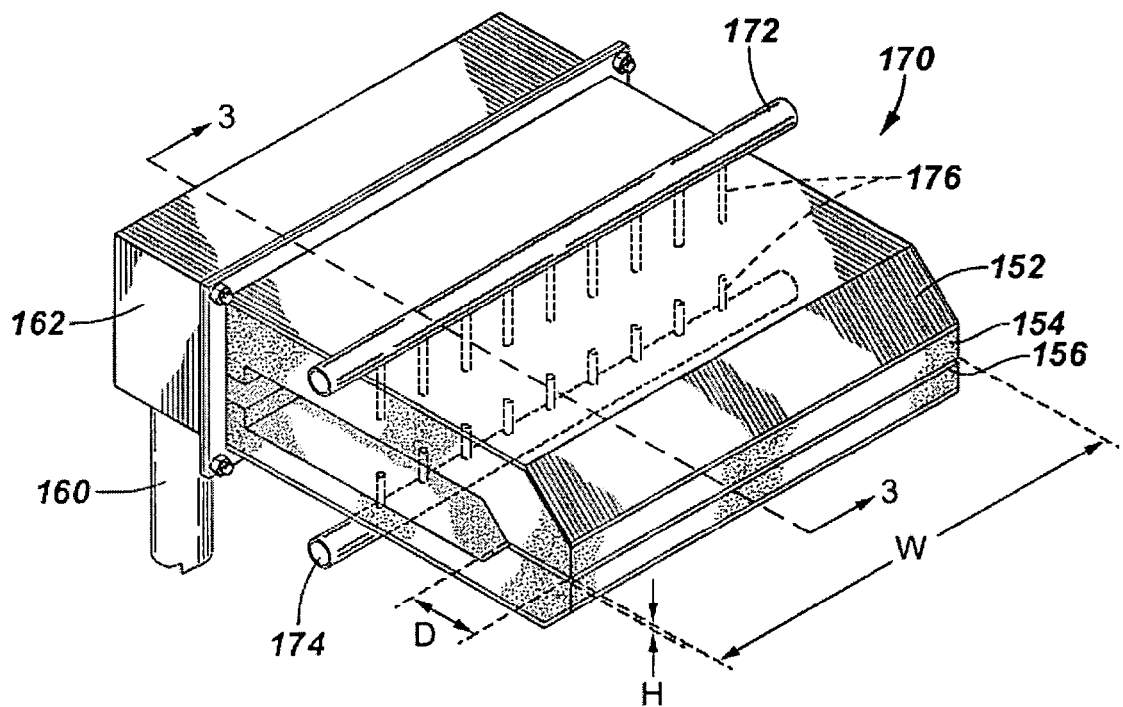
FIG. 2 is a perspective view of the fiberization burner of FIG. 1 modified to include non-cooled secondary oxidant injection.
Figure 3:
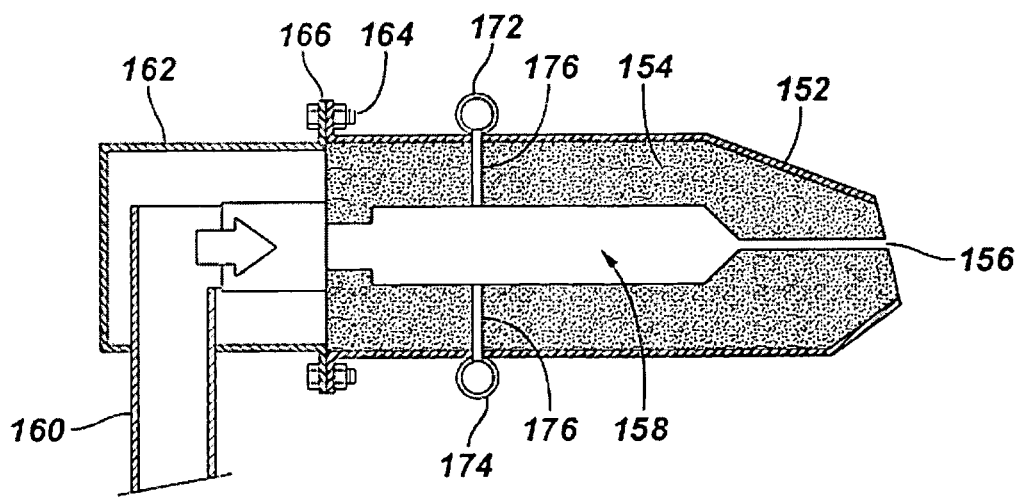
FIG. 3 is a cross-sectional view of the burner of FIG. 2.

FIG. 2 is a perspective view, and FIG. 3 is a cross-sectional view, of the fiberization burner of FIG. 1 modified to include non-cooled oxygen injection in accordance with one burner of the present invention. Burner 170 includes two oxygen manifolds 172 and 174, which may be stainless steel pipe or other alloy pipe, or ceramic tubes, each having a series of holes therein for accepting a corresponding number of ceramic tubes 176 through which oxygen is charged into combustion chamber 158.

In operation of fiberization burners of the invention, inorganic primary fibers are directed by means of guides and rollers into the flame produced by the fiberization burner. The mass flow rate of the inorganic material, for example glass, is a function of the primary fiber diameter, the flame temperature of the burner, the burner geometry, for example slot size of the burner, the pressure in the burner, and the product code fiber diameter. The process operating conditions are generally not independent values but have some degree of interaction. Oxygen-enhanced oxidant/fuel fiberization is markedly different than the traditional air-fuel fiberization process. The general principle is to operate combustion in the burner in a manner that replaces some of the air with a separate source of oxygen. The overall combustion ratio may not change. The process of combining fuel and oxygen-enriched oxidant will occur in the burner combustion chamber after the gases have passed over the flame arrestor safety device. The flame temperature of the combustion gases can be controlled by varying the air to oxygen ratio in of the oxidant. In accordance with the systems and processes of the invention, a standard burner firing 1600 scfh of natural gas, from 0 to about 400 scfh of oxygen may be safely injected into the burner in conjunction with an appropriate air flow.

Figure 4:
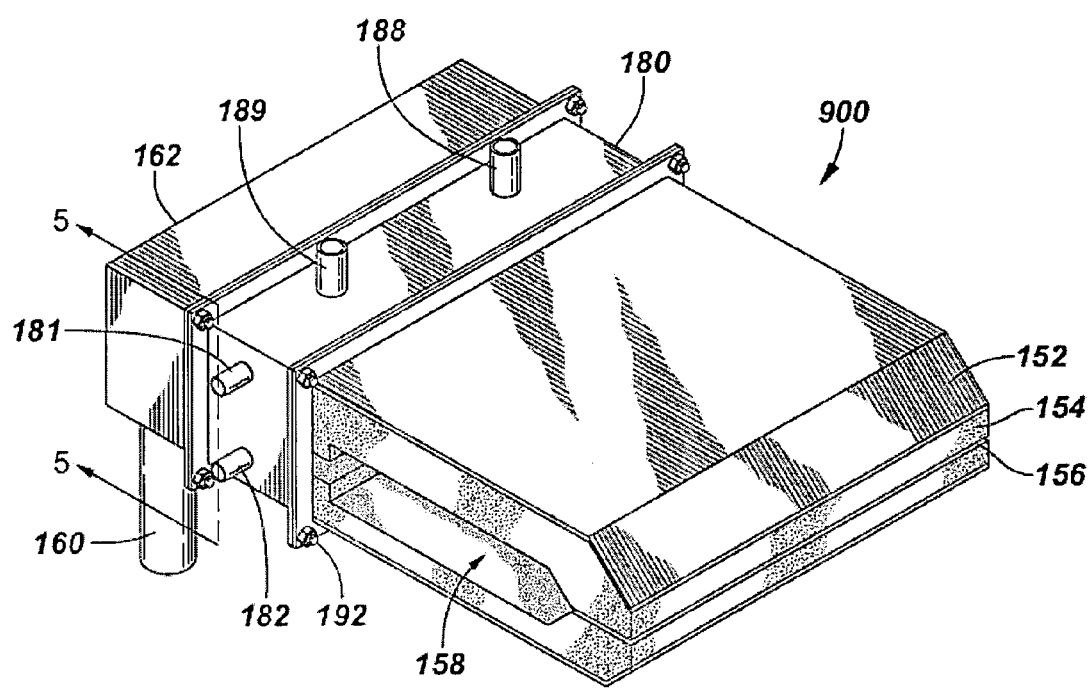
FIG. 4 is a perspective view of the fiberization burner of FIG. 1 modified to include a gas-cooled injector that may be used to inject secondary oxidant or, with modification, fuel.
Figure 5:
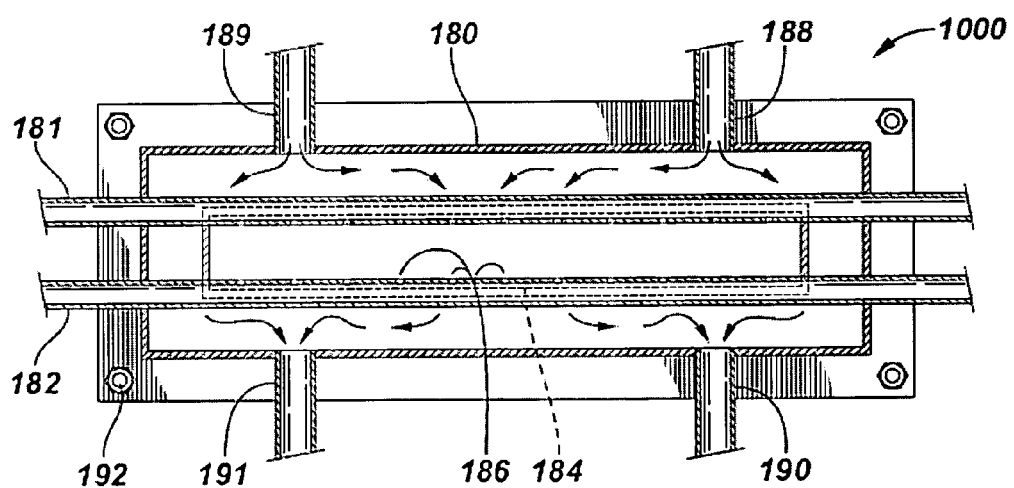
FIG. 5 is a cross-sectional view taken along 5-5 of the gas-cooled injector of FIG. 4.

FIG. 4 is a perspective view of the fiberization burner of FIG. 1 modified to include a gas-cooled injector that may be used to inject secondary oxidant or, with modification, fuel. FIG. 5 is a cross-sectional view, taken along section 5-5 in FIG. 4, of an injector 1000 useful in burner 900. Burner 900 includes the metallic shell 152, refractory burner block 154, burner slot 156, and air-fuel mix manifold 160 and 162 of prior art burner embodiment 150 of FIG. 1, and in addition includes an injector 1000 comprising a metallic rectangular outer tube 180 and a similar but smaller rectangular tube 184 positioned inside of outer rectangular tube 180, as illustrated in FIG. 5. outer rectangular tube 180 and inner rectangular tube 184 define a volume through which a cooling gas may enter through inlets 188 and 189, and exit through outlets 190 and 191. Fuel or secondary oxidant may be injected through manifolds 181 and 182, which may be stainless steel or other alloy metal tubes. A plurality of holes 186 may be positioned uniformly near the bottom of tube 181 and top of tube 182 to inject fuel or secondary oxidant. Since tubes 181 and 182 are exposed to hot combustion gases, cooling is provided. Bolts or other fasteners 192 may be used to fasten injector 1200 in burner 1100. More or mess than two gas coolant inlets and outlets may be provided in other embodiments as desired, and these alternative embodiments are considered within the invention.

Figure 6:
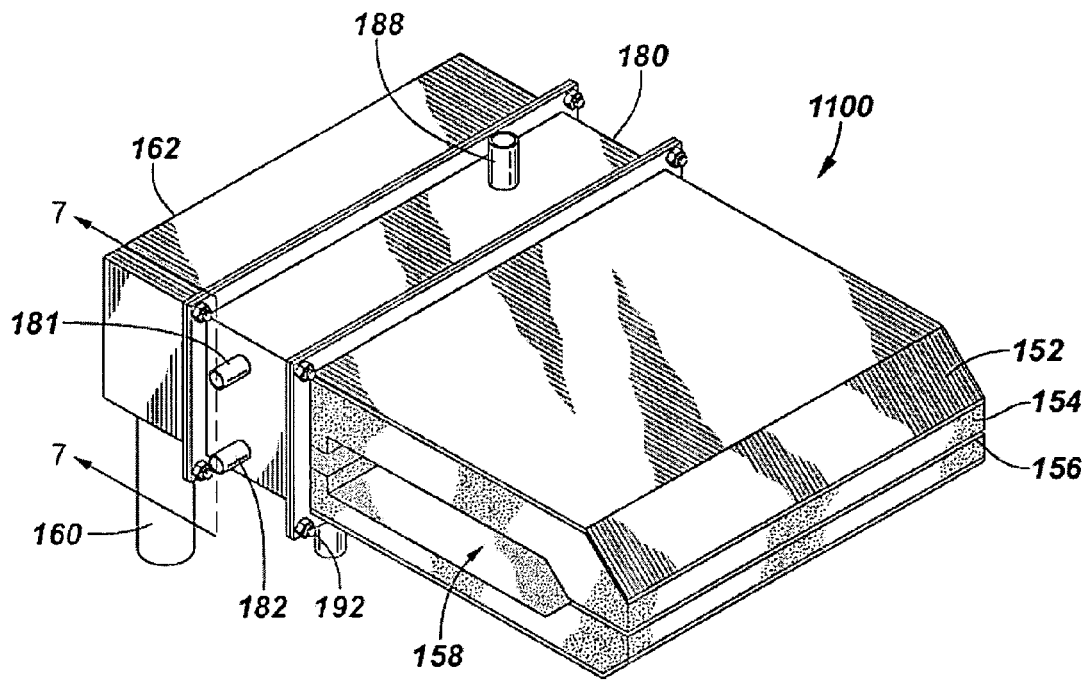
FIG. 6 is a perspective view of the fiberization burner of FIG. 1 modified to include a liquid-cooled injector that may be used to inject secondary oxidant or, with modification, fuel.
Figure 7:
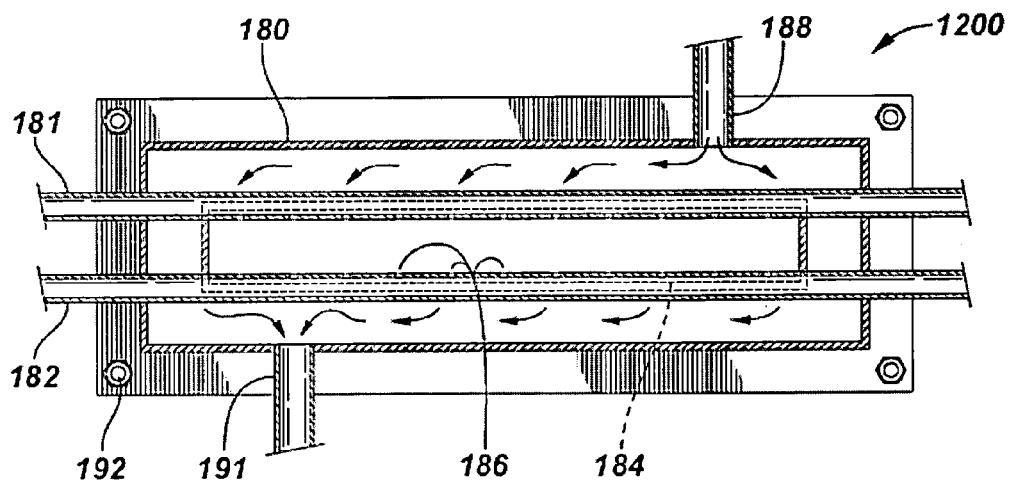
FIG. 7 is a cross-sectional view taken along 7-7 of the liquid-cooled injector of FIG. 6.

FIG. 6 is a perspective view of the fiberization burner of FIG. 1 modified to include a liquid-cooled injector that may be used to inject secondary oxidant or, with modification, fuel. FIG. 7 a cross-sectional view, taken along section 7-7 in FIG. 6, of a liquid-cooled injector 1200 used in burner 1110. Burner 1100 and injector 1200 are similar to burner 900 and gas-cooled injector 1000 of FIGS. 4 and 5, except that for liquid ingress and egress only one inlet and one outlet need be provided. Embodiments employing more than one liquid coolant inlet and more than one liquid coolant outlet are considered within the invention, but may not be necessary in all circumstances due to better cooling of the liquid.

Figure 8:
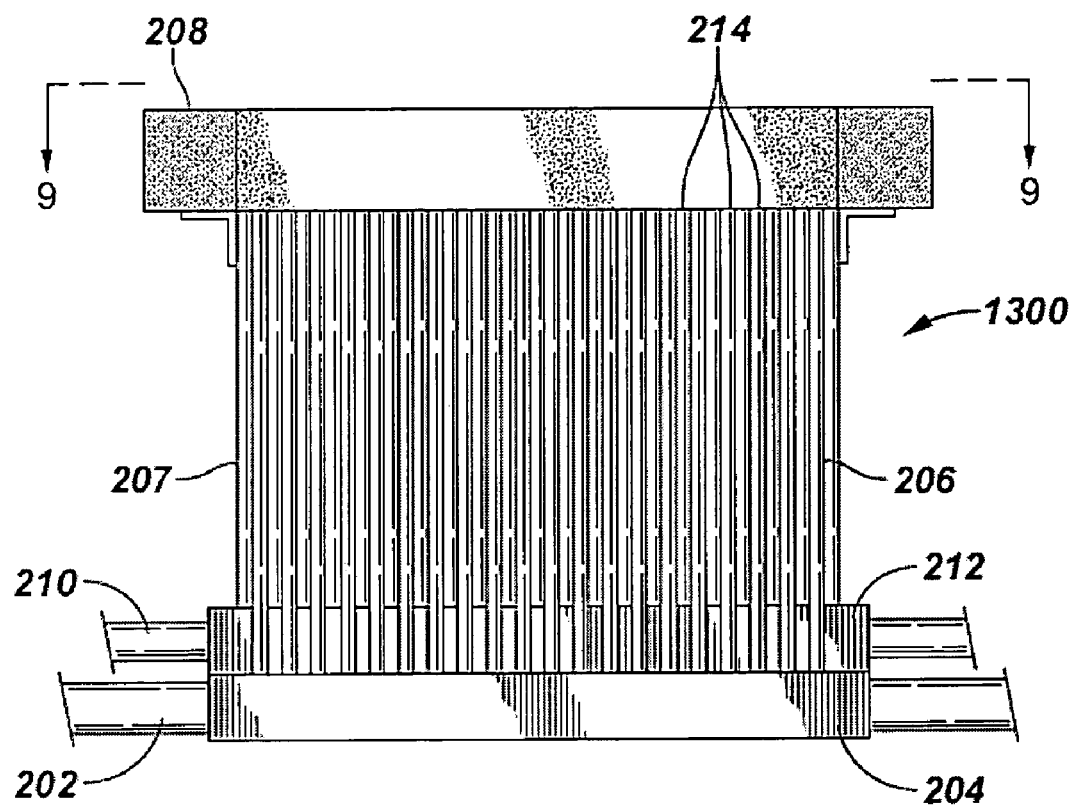
FIG. 8 is a plan view of a nozzle mix fuel/oxidant burner of the invention.
Figure 9:
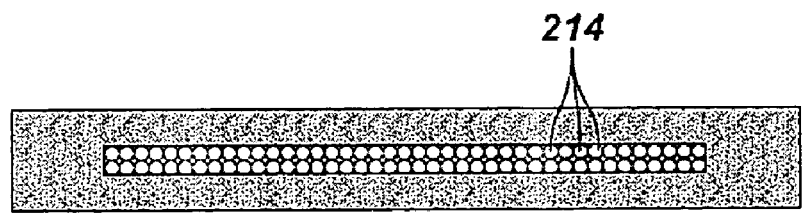
FIG. 9 is an end elevation view of the burner of FIG. 8.
Figure 10:
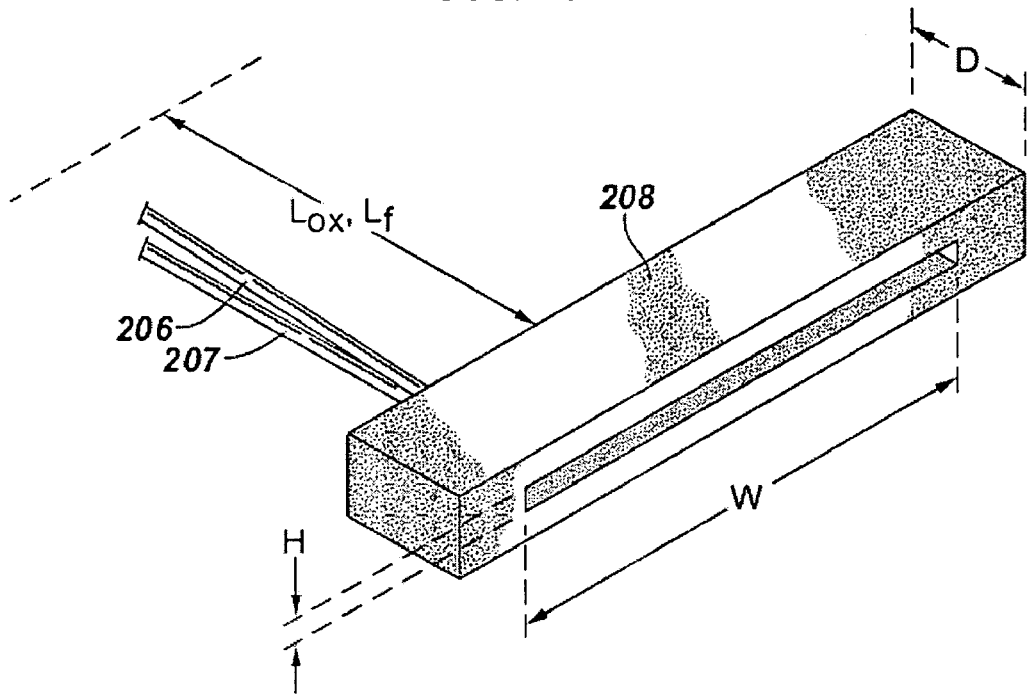
FIG. 10 is a schematic illustration of the burner of FIGS. 8 and 9 to point out certain physical dimensions of the burner.

FIG. 8 is a plan view of a nozzle mix fuel/oxidant burner 1300 useful in the invention, and FIG. 9 is an end elevation view of the burner of FIG. 8. In burner 1300, oxygen-enriched oxidant and fuel are directed to flow through separate pluralities of tubes 206 and 207, respectively, ending in separate nozzles 214. An oxygen-enriched oxidant inlet 202 supplies a chamber or manifold 204 which then feed tubes 206. Similarly, fuel inlet 210 supplies a fuel chamber or manifold 212, which directs fuel through tubes 207. Fuel is then combusted at nozzles 214. The combustion product gases are directed through a slot defined by a refractory spacer 208, and then at the inorganic primary fibers for fiberization. The number of tubes oxidant 206 and fuel tubes 207 may vary widely, but generally the number of oxidant tubes ranges from about 50 to about 150, while the number of fuel tubes 207 may range from about 25 to about 75. The length of the tubes may range from about, 3 to about 10 inches, while the diameter may range from about 1/32 inch up to 0.5 inch. The ratio of number of oxygen conduits to fuel conduits may range from about 1 to about 5, or from about 2 to about 4, and the oxygen conduits may all be circular in cross-section and have the same diameter; similarly, the fuel conduits may all be circular and have the same diameter. FIG. 10 illustrates schematically some physical dimensions that the burner apparatus of FIGS. 8 and 9 may have. Apparatus within this embodiment include those wherein the oxygen conduits may all be equal in length $L_{ox}$ and all fuel conduits may be equal in length $L_f$, although the invention is not so limited. Other apparatus within this embodiment include those wherein the recess defined by the refractory slot has a width W, a depth D, and a height H within the following ranges: W/H may range from about 10 to about 100, or from about 15 to about 80, and W/D may range from about 4 to about 12, or from about 6 to about 10. Other embodiments includes those wherein the ratio of length of oxygen tubes $L_{ox}$ and fuel tubes $L_f$ to depth of recess D ranges from about 5 to about 10. The spacing between tubes may be uniform and equal to or less than about one tube diameter. In certain embodiments the fuel conduits may be arranged side-by-side in touching arrangement in a plane, and the oxygen conduits may be arranged side-by-side in touching arrangement in a different plane. The fuel and oxygen conduits may touch each other. The fuel and oxidant conduits may be comprised of stainless steel or other alloy. As may be seen schematically in FIG. 9, this particular burner configuration provides a similar effect as a premix slot type burner in producing a wide, flat flame for fiberization.

According to the present invention, the fuel and the oxidant are introduced in the burner either through separate tubes in the burner assembly, or are premixed. The term "fuel", according to this invention, means a combustible composition comprising a major portion of, for example, methane, natural gas, liquefied natural gas, propane, atomized oil or the like (either in gaseous or liquid form). Fuels useful in the invention may comprise minor amounts of non-fuels therein, including oxidants, for purposes such as premixing the fuel with the oxidant, or atomizing liquid fuels.

The total quantities of fuel and oxidant used by the combustion system are such that the flow of oxygen may range from about 0.9 to about 1.2 of the theoretical stoichiometric flow of oxygen necessary to obtain the complete combustion of the fuel flow. Another expression of this statement is that the combustion ratio is between 0.9 and 1.2.

The velocity of the fuel gas in the various burners depends on the burner geometry used, but generally is at least about 15 m/s. The upper limit of fuel velocity depends primarily on the desired attenuated fiber geometry and the geometry of the burner; if the fuel velocity is too low, the flame temperature may be too low, providing inadequate fiberization, which is not desired, and if the fuel flow is too high, flame might impinge on downstream equipment, or be wasted, which is also not desired.

Additionally, the invention also provides stabilization of the flame with an auxiliary injection of fuel and/or oxidant gases. Injection of the oxidant fluid may be made by premix of fuel and primary oxidant, usually air, and in addition secondary oxidant injection, using either a non-cooled injector, a gas-cooled injector, or a liquid-cooled injector, as explained in reference to the figures. When injecting secondary oxidant such as industrial oxygen in a gas-cooled or liquid-cooled burner, the hole diameter 186 (FIG. 5) or tube 176 diameter in a non-cooled injector (FIG. 2) may be such that the secondary oxidant velocity does not exceed about 200 ft/sec at 400 scfh flow rate. The internal pressure of the burner should not exceed about 10 psig.

Apparatus and methods of the present invention are intended to be used, for example, to replace air-fuel combustion burners in already existing fiberization processes, and/or to be used as the main source of energy in new fiberization burners.

Suitable materials for the refractory block in the burners are fused zirconia ($ZrO_2$), fused cast AZS (alumina-zirconia-silica), rebonded AZS, or fused cast alumina ($Al_2O_3$). The choice of a particular material is dictated among other parameters by the chemistry and type of inorganic fibers to be produced.

Figure 11:
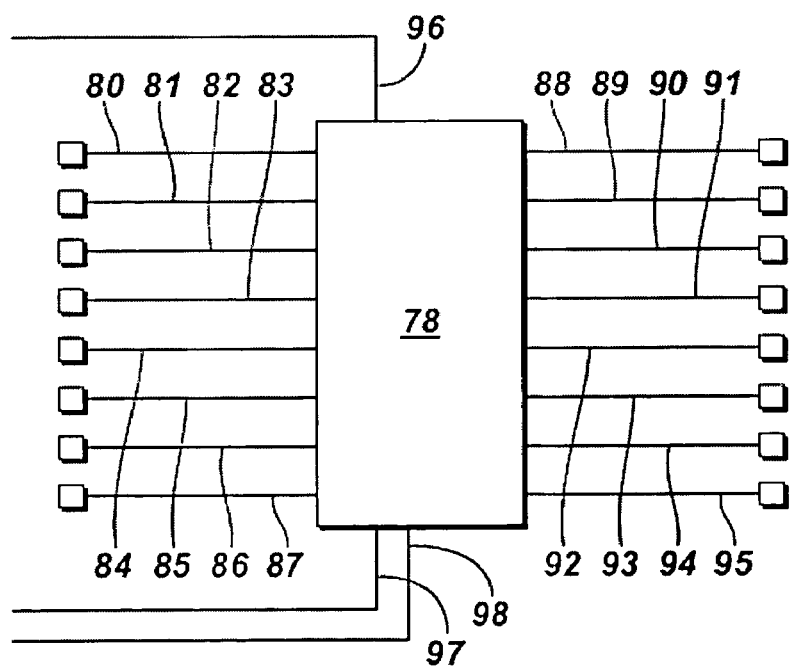
FIG. 11 is a schematic block diagram of a combustion process control scheme useful in the invention It is to be noted, however, that the appended drawings are not to scale and illustrate only typical embodiments of this invention, and are therefore not to be considered limiting of its scope, for the invention may admit to other equally effective embodiments.

FIG. 11 is a schematic block diagram of one non-limiting combustion process control scheme in accordance with the invention. A master controller 78 is shown, but the invention is not so limited, as any combination of controllers could be used. The controller may be selected from PI controllers, PID controllers (including any known or reasonably foreseeable variations of these), and computes a residual equal to a difference between a measured value and a set point to produce an output to one or more control elements. The controller may compute the residual continuously or non-continuously. Other possible implementations of the invention are those wherein the controller comprises more specialized control strategies, such as strategies selected from feed forward, cascade control, internal feedback loops, model predictive control, neural networks, and Kalman filtering techniques. In FIG. 11, the lines and boxes numbered 80-87 may represent sensors, for example sensors for the following parameters, which are merely exemplary examples:

80=$V_{fuel}$, velocity of fuel entering burner;
81=$V_{PO}$, velocity of primary oxidant entering burner;
82=$V_{SO}$, velocity of secondary oxidant entering burner;
83=$M_{fuel}$, mass flow rate of fuel entering burner;
84=$M_{PO}$, mass flow rate of primary oxidant entering burner;
85=$T_{fuel}$, temperature of fuel entering burner;
87=$T_{PO}$, temperature of primary oxidant entering burner;
88=$P_{PO}$, pressure of primary oxidant entering burner;
89=$H_{PO}$, humidity of primary oxidant.

The lines and boxes numbered 88-95 may represent control signals and actuators, respectively, for outputs for the following parameters, which are merely exemplary:

88=$V_{fuel}$, velocity of fuel entering burner;
89=$V_{PO}$, velocity of primary oxidant entering burner;
90=$M_{fuel}$, mass flow rate of fuel entering burner;
91=$M_{SO}$, mass flow rate of secondary oxidant entering burner;
92=$T_{fuel}$, temperature of fuel entering burner;
93=$T_{PO}$, temperature of primary oxidant entering burner;
94=$P_{SO}$, pressure of secondary oxidant entering burner;
95=$M_{EFF}$ (or $M_{HTF}$), mass flow rate of hot effluent (or heat transfer fluid).

Other parameters may be included as inputs, such as desired fiber diameter and/or length 96, burner geometry 97, and combustion ratio 98.

The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to burner control elements, and/or to local devices associated with burner control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the invention.

Controllers useful in the systems and methods of the invention may vary in their details. One PID controller useful in the invention may be expressed mathematically as in Equation 1:

$$u(t)Kp\ [e(t)+1/Ti \cdot \int e(t)dt+Td \cdot \dot{e}(t)] \quad (1)$$

wherein:
∫ means integrate;
$\dot{e}(t)$ means the time derivative;
u(t) is controller output, which may be burner flame temperature, for example;
e(t) means difference between a desired and measured (real time) value;
Td is a constant for describing the derivative part of the algorithm (the derivative part may be filtered to avoid deriving high frequencies);
Ti is a constant for describing the integrating part of the algorithm; and
Kp is a proportional gain constant.

In the s-plane (Laplace), the PID controller may be expressed as (Equation 2):

$$Hr(s)=Kp\ [1+1/Ti\ s+Td\ s/(1+Tf s)] \quad (2)$$

wherein:
s is the variable in the s-plane; and
Tf is a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form (Equation 3):

$$s=(1-z-1)/T \quad (3)$$

while the derivative part may be approximated using an Euler model (Equation 4):

$$s=2/T \cdot (1-z-1)/(1+z-1) \quad (4)$$

wherein T is the sampling time.

The resulting discrete model may then be used directly in the combustion or burner control algorithm. Other discrete models, derived using other transforms, are useful in the invention, and will be apparent to control technicians or control engineers of ordinary skill.

The controller may utilize Model Predictive Control (MPC). MPC is an advanced multivariable control method for use in multiple input/multiple output (MIMO) systems. An overview of industrial Model Predictive Control can be found at: www.che.utexas.edu/~qin/cpcv/cpcv14.html. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2.... MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present invention it may be necessary to use nonlinear MPC. In so-called advanced control of variosu systems, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

The feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

In certain embodiments of the invention it may be desired to implement heat recovery. In embodiments of the invention employing a heat transfer fluid for heat recovery, as discussed in Applicant's co-pending application Ser. No. 11/314,437 filed concurrently herewith, it is possible for the hot intermediate heat transfer fluid to transfer heat to the oxidant or the fuel either indirectly by transferring heat through the walls of a heat exchanger, or a portion of the hot intermediate fluid could exchange heat directly by mixing with the oxidant or the fuel. In most cases, the heat transfer will be more economical and safer if the heat transfer is indirect, in other words by use of a heat exchanger where the intermediate fluid does not mix with the oxidant or the fuel, but it is important to note that both means of exchanging heat are contemplated by the present invention. Further, the intermediate fluid could be heated by the hot flue gases by either of the two mechanisms just mentioned.

In certain embodiments employing heat recovery, the primary means for transferring heat may comprise one or more heat exchangers selected from the group consisting of ceramic heat exchangers, known in the industry as ceramic recuperators, and metallic heat exchangers further referred to as metallic recuperators. Systems in accordance with the invention include those wherein the primary means for transferring heat are double shell radiation recuperators. Preheater means useful in the invention comprise heat exchangers selected from ceramic heat exchangers, metallic heat exchangers, regenerative means alternatively heated by the flow of hot intermediate fluid and cooled by the flow of oxidant or fuel that is heated thereby, and combinations thereof. In the case of regenerative means alternately heated by the flow of hot intermediate fluid and cooled by the flow of oxidant or fuel, there may be present two vessels containing an inert media, such as ceramic balls or pebbles. One vessel is used in a regeneration mode, wherein the ceramic balls, pebbles or other inert media are heated by hot intermediate fluid, while the other is used during an operational mode to contact the fuel or oxidant in order to transfer heat from the hot media to the fuel or oxidant, as the case might be. The flow to the vessels is then switched at an appropriate time.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures.

What is claimed is:

1. An apparatus comprising:
   a refractory block defining a refractory slot and a substantially rectangular flame exit end having a width greater than its height;
   a plurality of oxygen conduits in a first horizontal plane having inlet ends and outlet ends, the inlet ends fluidly connected to a source of oxygen, and the outlet ends fluidly connected to an entrance to the refractory slot at an entrance end of the refractory block;
   a plurality of fuel conduits in a second horizontal plane and substantially parallel thereto, the plurality of fuel conduits having inlet ends and outlet ends, the inlet ends fluidly connected to a source of fuel, and the outlet ends fluidly connected to the entrance to the refractory slot;
   wherein the refractory slot defines a recess wherein the ends of the oxygen conduits and the ends of the fuel conduits are recessed from an exit of the refractory slot, and the plurality of oxygen conduits and the plurality of fuel conduits are adapted to disperse the fuel and the oxygen uniformly and begin combusting the fuel in the refractory slot, the refractory slot adapted to direct a flame toward primary fibers to be fiberized.

2. The apparatus of claim 1 wherein a ratio of number of oxygen conduits to fuel conduits ranges from about 1 to about 5.

3. The apparatus of claim 1 wherein all of the oxygen conduits are circular in cross-section and have the same diameter, and wherein all of the fuel conduits are circular in cross-section and have the same diameter.

4. The apparatus of claim 1 wherein the oxygen conduits are all equal in length, and all fuel conduits are equal in length.

5. The apparatus of claim 1 wherein the recess defined by the refractory slot has a width W, a depth D, and a height H within the following ranges: W/H ranges from about 10 to about 100; W/D ranges from about 4 to about 12; and wherein a ratio of length of oxygen conduits and fuel conduits to depth of recess D ranges from about 5 to about 10.

6. The apparatus of claim 1 comprising a controller adapted to control combustion temperature by monitoring one or more parameters selected from velocity of the fuel, velocity of the primary oxidant, mass flow rate of the fuel, mass flow rate of the primary oxidant, energy content of the fuel, temperature of the fuel as it enters the burner, temperature of the primary oxidant as it enters the burner, pressure of the oxidant entering the burner, humidity of the primary oxidant, burner geometry, oxidation ratio, and combinations thereof.

7. The apparatus of claim 1 wherein the second horizontal plane lies below the first horizontal plane.

8. A process comprising:
   a) flowing oxygen through a plurality of oxygen conduits into a refractory slot of a refractory block, the plurality of oxygen conduits lying in a first horizontal plane having inlet ends and outlet ends, the inlet ends fluidly connected to a source of oxygen, and the outlet ends fluidly connected to an entrance to a refractory slot at an entrance end of the refractory block, the refractory block further defining a substantially rectangular flame exit end having a width greater than its height;
   b) flowing a fuel fluid through a plurality of fuel conduits in a second horizontal plane and substantially parallel to the first horizontal plane into the refractory slot, the plurality of fuel conduits having inlet ends and outlet ends, the inlet ends fluidly connected to a source of fuel, and the outlet ends fluidly connected to the entrance to the refractory slot;
   c) combusting the fuel in the refractory slot to form a substantially flat flame, the refractory slot defining a recess wherein the ends of the oxygen conduits and the ends of the fuel conduits are recessed from an exit of the refractory slot, the plurality of oxygen conduits and the plurality of fuel conduits dispersing the fuel and the oxygen uniformly in the recess;
   d) directing the substantially flat flame to intersect a primary fiber; and
   e) attenuating and fiberizing the primary fiber to form a plurality of fibers.

9. The process of claim 8 wherein the fuel is a gaseous fuel, the gaseous fuel is selected from methane, natural gas, liquefied natural gas, propane, carbon monoxide, hydrogen, steam-reformed natural gas, atomized oil or mixtures thereof, and the oxygen stream comprises at least 90 mole percent oxygen.

10. The process of claim 8 comprising controlling flame temperature by monitoring one or more parameters selected from velocity of the fuel, velocity of the oxygen, mass flow rate of the fuel, mass flow rate of the oxygen, energy content of the fuel, temperature of the fuel as it enters the burner, temperature of the oxygen as it enters the burner, pressure of the oxygen entering the burner, humidity of the oxygen, burner geometry, oxidation ratio, and combinations thereof, and employs a control algorithm to control combustion temperature based on one or more of these input parameters.

* * * * *